Sept. 15, 1931.  B. LAZICH  1,823,052

RAILWAY TRACK CIRCUITS

Filed Dec. 1, 1930

INVENTOR:
B. Lazich,
BY A. R. Vincill
His ATTORNEY.

Patented Sept. 15, 1931

1,823,052

UNITED STATES PATENT OFFICE

BRANKO LAZICH, OF EDGEWOOD, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY TRACK CIRCUITS

Application filed December 1, 1930. Serial No. 499,168.

My invention relates to railway track circuits, and has for an object the provision of novel and improved means for expediting the release of a track relay when a vehicle enters the section of track with which the relay is associated.

I will describe one form of track circuit embodying my invention, and will then point out the novel features thereof in claims.

Figure 1:
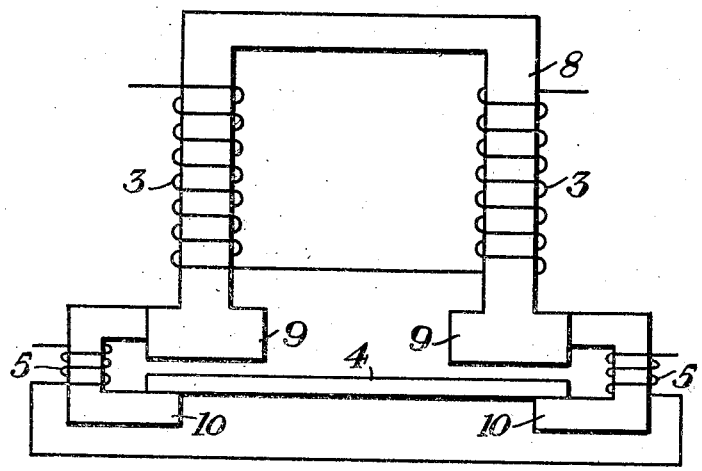
Figure 2:
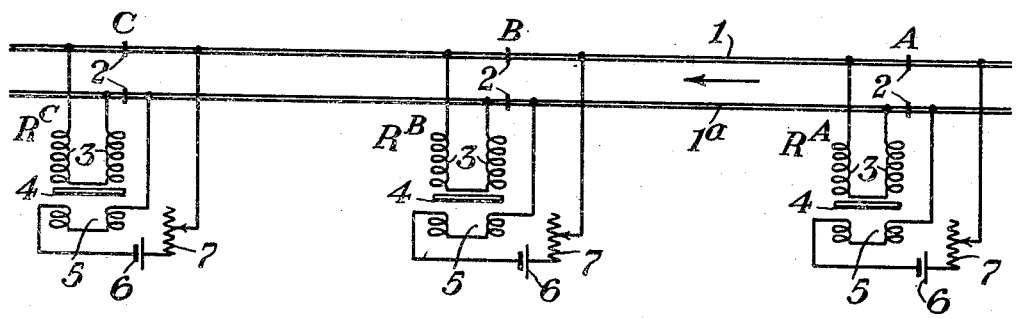

In the accompanying drawings, Fig. 1 is a view, partly in front elevation and partly diagrammatic, showing one form of relay which may be used in a track circuit embodying my invention. Fig. 2 is a diagrammatic view showing one form of track circuit embodying my invention.

Similar reference characters refer to similar parts in each of the views.

Referring first to Fig. 1, the relay comprises the usual U-shaped magnetizable core 8, terminating in poles pieces 9 which cooperate with an armature 4. The core 8 is provided with a winding 3 which, when energized, causes the core to attract the armature 4 toward the pole pieces 9. Each pole piece 9 is provided with a U-shaped extension 10 extending under the armature 4 and provided with a winding 5, which, when energized, tends to oppose the flow of magnetic flux due to winding 3 through the armature.

Referring now to Fig. 2, the reference characters 1 and 1ª designate the rails of a railway track, which rails are divided by insulated joints 2 to form a plurality of track sections, such as A—B and B—C. Traffic along this track normally moves in the direction indicated by the arrow. Each section is provided with a track relay which is designated by the reference character R with an exponent corresponding to the location, and each of which relays may be similar to the relay shown in Fig. 1. The main winding 3 of each relay is connected across the rails of the associated section, and the auxiliary winding 5 of each relay is connected across the rails of the section next in the rear through a track battery 6 and an adjustable resistance 7.

The operation of the apparatus shown in Fig. 2, is as follows: When section A—B is unoccupied, the main winding 3 of relay R^A is energized to a sufficient extent to overbalance the effect of the auxiliary winding 5, so that the armature 4 is attracted against the pole pieces 9. Assuming now that a train moving toward the left enters the section to the right of point A, the wheels and axles of such train will form a low resistance shunt across the track rails, and so will increase the amount of current supplied to the winding 5 of relay R^A by battery 6. Until the train enters section A—B, however, the effect of winding 3 will still be sufficient to keep armature 4 in its attracted position against the pole pieces 9. When the train enters section A—B, the wheels and axles will form a low resistance shunt around winding 3 of relay R^A, thereby substantially deenergizing this winding. Winding 5 will still be supplied with a comparatively large amount of current from battery 6 due to the fact that the section to the rear of point A is still shunted by some of the wheels and axles of the vehicle. The result will be that the magnetic flux in the core 8 of relay R^A will suddenly be reversed, so that armature 4 will suddenly be forced to its retracted position against the lower arms of the pole piece extensions 10. The same action will occur as the train passes points B and C.

When the rear end of the train passes out of section A—B, winding 3 of relay R^A will again be supplied with current, so that armature 4 of this relay will again be attracted to the pole pieces 9.

Although I have herein shown and described only one form of track circuit apparatus embodying my invention, it is understood that various changes and modifications may be made therein within the scope of the appended claims without departing from the spirit and scope of my invention.

Having thus described my invention, what I claim is:

1. In combination, a stretch of railway track divided into sections; a relay for each section comprising an armature biased to a released position, a main winding for moving the armature to an operated position and an auxiliary winding for opposing the action of flux due to said main winding on the armature; the main winding of each relay being connected across the rails of the associated section and the auxiliary winding being connected across the rails of the section next in the rear, and a source of track circuit current interposed between each auxiliary winding and one of the track rails.

2. In combination, two sections of railway track, a source of track circuit current for the forward section, a track relay for the forward section having a main winding connected across the rails thereof and an auxiliary winding opposing the action of the flux due to the main winding on the armature of the relay, said auxiliary winding being connected in series with a second source of track circuit current across the rails of the rear section.

3. In combination a stretch of railway track divided into sections; a relay for each section comprising an armature biased to a released position, a main winding for moving the armature to an operated position and an auxiliary winding for opposing the action of flux due to said main winding on the armature; and a track circuit for each section made up of the main winding of the relay for the section and the auxiliary winding of the relay for the section next in advance as well as a source of track circuit current.

In testimony whereof I affix my signature.

BRANKO LAZICH.